United States Patent [19]

Sondergeld et al.

[11] Patent Number: 4,933,911

[45] Date of Patent: Jun. 12, 1990

[54] METHOD FOR DETERMINING SEISMIC VELOCITIES

[75] Inventors: Carl H. Sondergeld, Broken Arrow; Chandra S. Rai, Tulsa, both of Okla.

[73] Assignee: Amoco Corporation, Chicago, Ill.

[21] Appl. No.: 402,113

[22] Filed: Sep. 1, 1989

[51] Int. Cl.$^5$ ............................................. H04R 17/00
[52] U.S. Cl. ........................................ 367/13; 73/594; 73/597
[58] Field of Search ..................... 367/13, 27; 73/594, 73/597

[56] References Cited

U.S. PATENT DOCUMENTS

| | | | |
|---|---|---|---|
| 2,688,124 | 8/1954 | Doty et al. | 367/27 |
| 2,949,973 | 8/1960 | Broding et al. | 367/27 |
| 3,537,541 | 11/1970 | Desai et al. | 73/597 |
| 4,380,930 | 4/1983 | Podhrasky et al. | 73/594 |
| 4,683,556 | 7/1987 | Willis | 367/27 |

Primary Examiner—Ian J. Lobo
Attorney, Agent, or Firm—Timothy D. Stanley

[57] ABSTRACT

The present invention relates generally to a method for determining seismic velocities and more particularly to a method and system for objectively determining seismic velocities from samples of the earth's subterranean formation. Additionally, the present invention provides a method for obtaining a measure of the variation of seismic velocities of propagation with pressure.

17 Claims, 5 Drawing Sheets

METHOD FOR DETERMINING SEISMIC VELOCITIES

The present invention relates generally to a method for determining seismic velocities of propagation and, more particularly, to a method for objectively determining seismic velocities of propagation in samples of the earth's subterranean formations.

Measurement of velocities of propagation using the pulse transmission technique is well established for a variety of materials. However, such technique can be time consuming and requires the subjective analysis of skilled operators to obtain estimates of the velocities of propagation. In fact, the use of the pulse transmission technique on samples of the earth is particularly difficult because of the variety of rock types and their complex microstructures. Consequently, an imparted energy pulse can be greatly attenuated as it propagates through the earth sample making velocity determinations difficult. In order to minimize errors in velocity determination resulting from the subjective analysis by the operator, investigators have employed higher frequency energy pulses to determine the velocities of propagation in both metals and ceramics. Unfortunately, these higher frequency techniques cannot be employed on samples of the earth due to scattering losses and higher intrinsic attenuation of the imparted energy pulse.

Determining the effect of varying pressures on seismic velocities of propagation through the earth is another important aspect in the determination of seismic velocities of propagation. However, decreasing the pressures to which samples of the earth are subjected while employing the pulse transmission technique can result in very poor quality signals. Such poor quality signals substantially deteriorate the precision of the pulse transmission technique and can require even more subjective analysis by highly skilled operators. Conversely, subjecting samples of the earth to the highest possible pressures can have the undesirable result of irreversibly altering the samples if the pressures applied are greater than their corresponding in-situ effective pressure.

In view of the foregoing, the present invention provides a novel method for determining seismic velocities of propagation from samples of the earth and the effect thereon of varying pressures, in addition to overcoming the limitations of existing pulse transmission techniques.

SUMMARY OF THE INVENTION

The present invention provides a novel method for determining velocities of propagation of seismic energy in the earth. In order to overcome the limitations of existing subjective methods for determining seismic velocities of propagation, the present invention provides an objective method for determining the velocity of propagation of seismic waves in the earth from samples of the earth.

More particularly, the present invention comprises obtaining a time series signal representative of the traveltimes for an energy pulse to propagate through samples of the earth. A first estimate of the seismic velocity of propagation can be obtained from an envelope signal computed from the time series signal. A second estimate of the seismic velocity of propagation can be obtained from the time series signal directly. Selected characteristics of the time series signal and energy pulse can be obtained and compared, whereby a best estimate of the seismic velocity of propagation in the earth can be obtained from the first and second estimates of seismic velocity.

By collecting a plurality of time series signals over a selected range of pressures acting on the sample of the earth, a measure of the variation of seismic velocities as a function of pressure can be determined. The pressures range from atmospheric to the in-situ effective pressure acting on the sample of the earth. More particularly, a master trace signal is obtained from the time series signal obtained at the highest pressure acting on the sample of the earth. The master trace signal commences at a traveltime corresponding to the estimated seismic velocity of propagation and extends for a period of time related to the spectral content of time series signal. The master trace can then be cross-correlated with each of the time series signals obtained at lesser pressures to obtain semblance functions. Traveltimes for peaks in the resulting semblance functions are located for each pressure point, and the largest peaks for each pressure point are curve fitted to a pressure function to obtain measures of the seismic velocities at selected pressure points as well as to obtain a measure of the variation of seismic velocity with pressure

DETAILED DESCRIPTION OF THE INVENTION

The present invention relates generally to a method for determining velocities of propagation of seismic energy in the earth.

Figure 1:
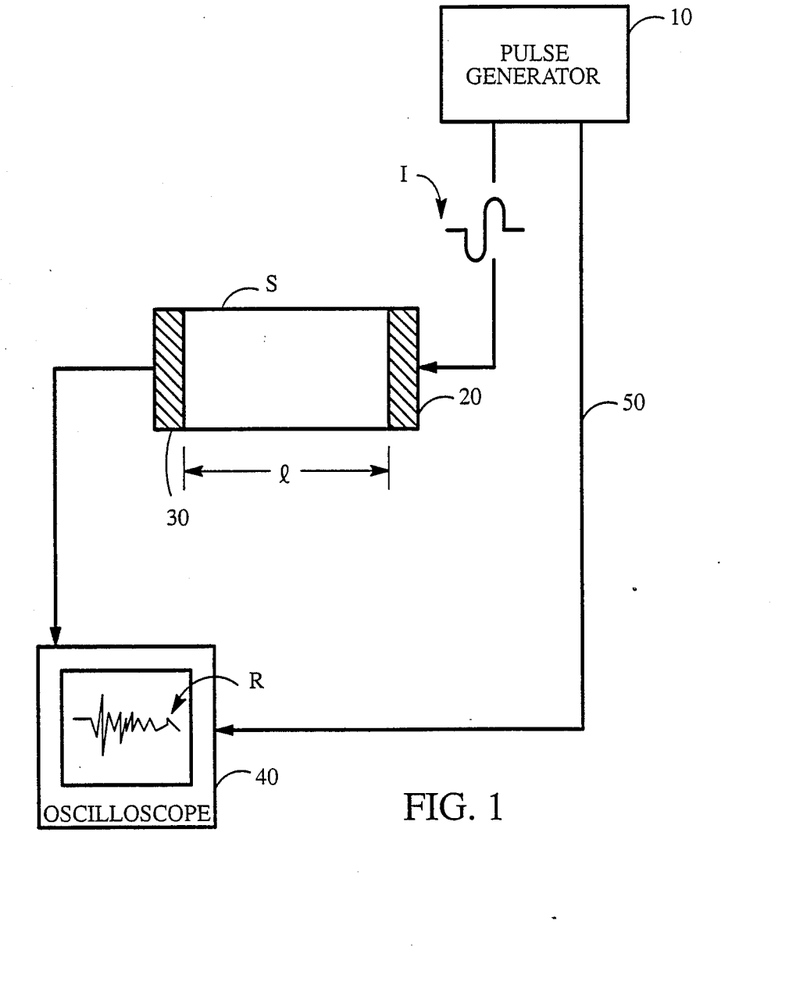
FIG. 1 is a schematic representation of the pulse transmission technique for determining seismic velocities of propagation in samples of the earth.

In order to better understand the present invention, the following introductory discussion is provided. The velocities of propagation of seismic energy in the earth's formations can be estimated using the pulse transmission technique whereby the elapsed time for an energy pulse to travel through a sample of the earth's formation is determined. A system for implementing this technique is represented schematically in FIG. 1 wherein an energy pulse I developed by pulse generator 10 is imparted into one end of sample S by a source transducer 20, and a time series signal R is received at an opposite end of the sample S by a receiver transducer 30 and displayed on oscilloscope 40. Since the travel distance L of the imparted energy pulse through the sample S can be measured quite accurately, all that is required to determine the velocity of propagation is the traveltime for the energy pulse to traverse the distance L. Typically, traveltimes are determined by clocking the time of a first arrival of the energy pulse I by starting a clock in oscilloscope 40 with a trigger pulse 50 from the pulse generator 10 at a time coinciding with the time of imparting the energy pulse I into the sample S.

When it is desired to determine the velocity of propagation for compressional waves (P) through a sample, one simply obtains signals generated by a P-wave source transducer and received by a P-wave receiver transducer. However, when it is desired to determine the velocity of propagation for shear waves (Sh or SV) through a sample of the earth, those skilled in the art will recognize that it is necessary to collect a dyad of signals $\phi_{ij}$ and process the dyad of signals $\phi_{ij}$ by rotation so as to ameliorate the effects of shear wave splitting which can be caused by anisotropic rock. The dyad of signals $\phi_{ij}$ comprises signals $\phi_{11}$, $\phi_{12}$, $\phi_{21}$, and $\phi_{22}$ wherein the subscript i indicates the polarization of the shear wave source transducer (Sh or SV) and the subscripting j indicates the polarization of the shear wave receiver transducer (Sh or SV). In general, a plurality of signals representative of each source-receiver combination (i.e., P—P, Sh—Sh, Sh—SV, SV—Sh and SV—SV) are recorded at each selected pressure point within the range of pressures. To simplify the following discussion, only signals obtained by one source-receiver combination will be discussed and if anisotropy corrections are required, they will have already been applied.

Figure 2:
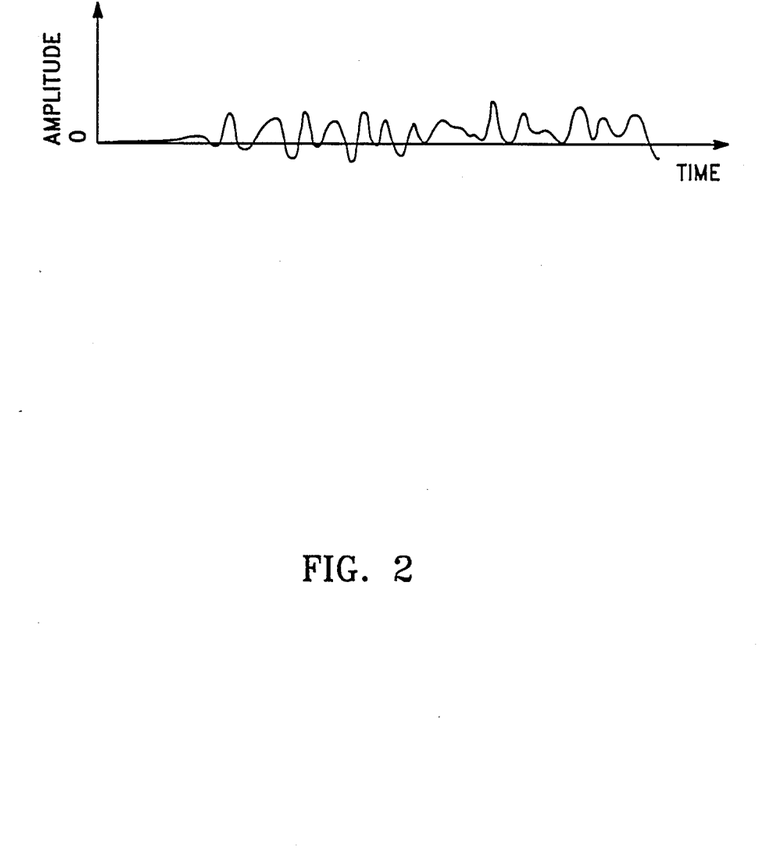
FIG. 2 represents time series signals obtained by the pulse transmission technique for which it is desired to determine arrival times and, hence, seismic velocities of propagation.

FIG. 2 is a time series signal representative of signals typically recorded for rock samples using the pulse transmission technique at pressures less than their corresponding in-situ effective pressures. The term "effective pressure" is understood to be the difference between the in-situ overburden vertical stress acting on the sample and its pore fluid pressure. As can be seen in FIG. 2, determination of arrival times of the energy pulse, and hence seismic velocities of propagation, is not always as simple as suggested. Rather, inhomogeneities of the earth's formations comprising the sample can result in complicated time series signals. The time series signal of FIG. 2 exemplifies the difficulties in determining arrival times, and hence seismic velocities of propagation, of the imparted energy pulse, especially at pressures less than the in-situ effective pressure. Shear wave velocity determinations can be even more difficult than compressional wave velocity determinations because of shear wave splitting and the earlier arrival of compressional waves. Consequently, determination of arrival times (and hence seismic velocities) in samples of the earth oftentimes requires the subjective analysis of highly skilled operators and can be fraught with undetected errors.

It is well established that velocities of propagation and attenuation of seismic energy imparted into the earth exhibit very pronounced dependence on the pressure. As such, the variations of seismic velocities with pressure are of particular concern to explorationists but difficult to ascertain. The pressure dependence of seismic velocities is also important for understanding the microstructure of rocks. Unfortunately, it is impractical to subject samples of the earth to the highest possible pressure and then measure velocities of propagation as pressure decreases because the samples can be irreversibly altered. Moreover, as the pressures decrease below the in-situ effective pressure, the quality of time series signals representative of the propagation of seismic energy can be substantially degraded, thus making velocity estimates difficult.

Figure 3:
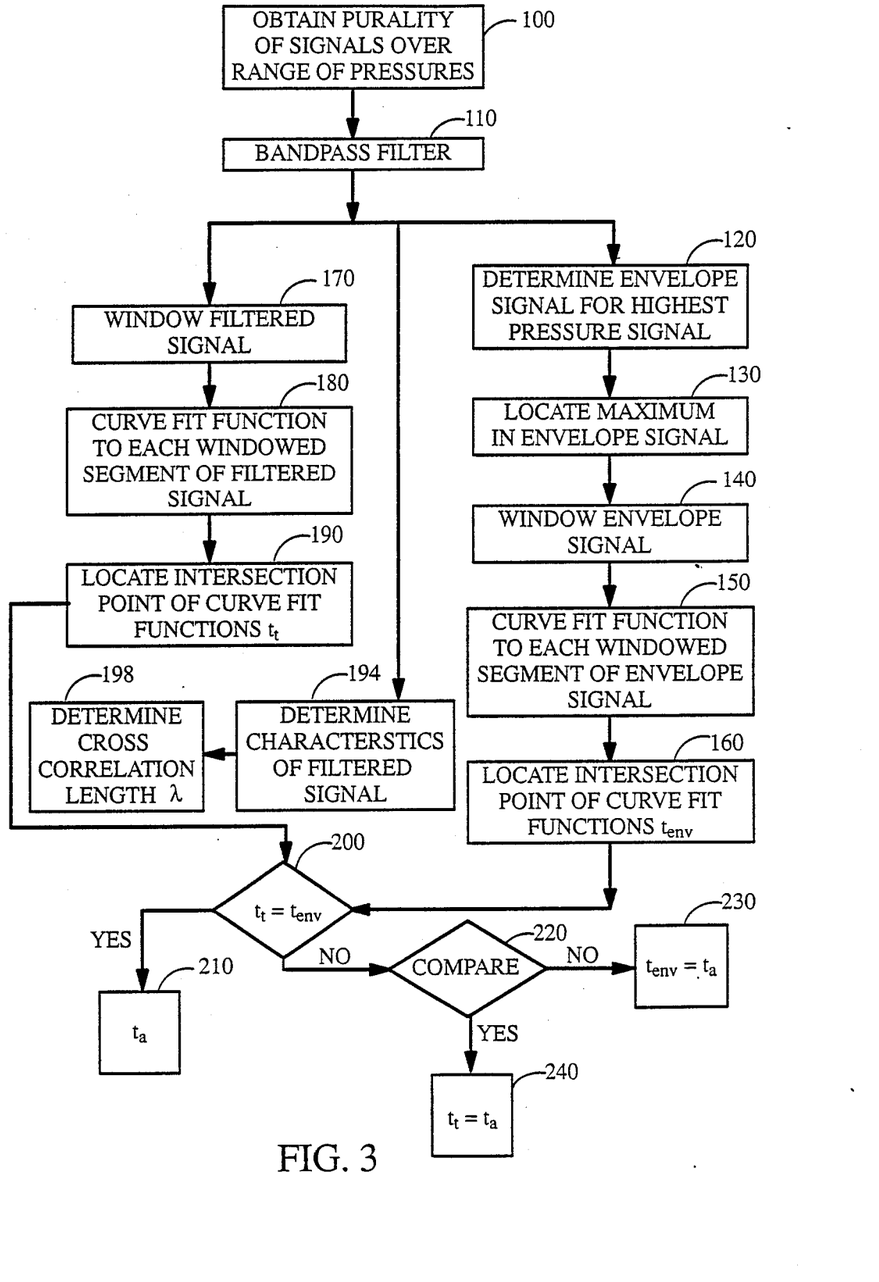
FIG. 3 represents a flow diagram of the present invention to obtain estimated seismic velocities.
Figure 4A:
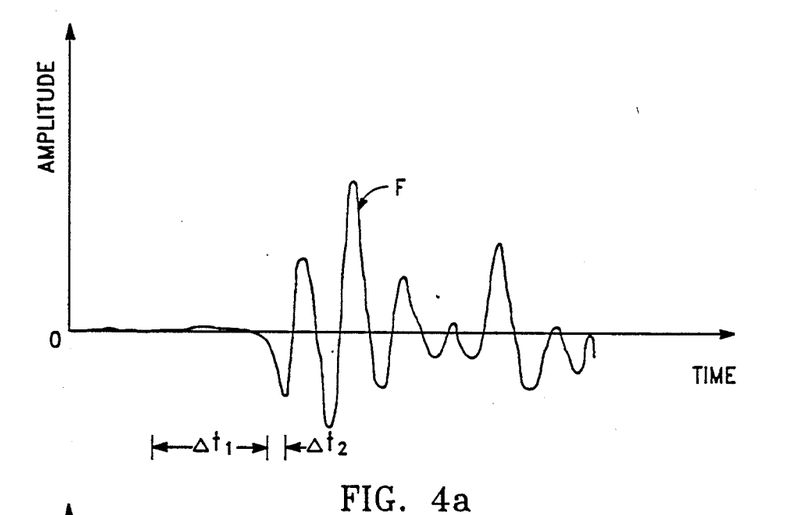
FIGS. 4a and 4b represent a filtered signal F and its corresponding envelope signal E, respectively, obtained from a sample of the earth at its in-situ effective pressure.

Looking now to FIG. 3, a generalized flow diagram of the present invention is provided. At step 100, a set of time series signals are recorded which are representative of the traveltimes for an energy pulse to propagate through a sample of the earth at a plurality of pressure points within a selected range of pressures. Typically, the pressure points are varied from atmospheric to one corresponding to the in-situ effective pressure acting on the sample. Preferably, five time series signals are recorded for each source-receiver combination at each selected pressure point. The signals recorded for each source-receiver combination at each pressure point can then be summed or stacked to produce a summed signal for each pressure point. By controlling the amplitude and frequency spectra and rise time of the energy pulse imparted into the sample of the earth, the summed signals from step 100 can be bandpass-filtered at 110 if necessary to suppress noise outside the frequency spectra of the imparted energy pulse to form filtered signals. The filtered signal F obtained at the highest pressure point is depicted in FIG. 4a.

Figure 4B:
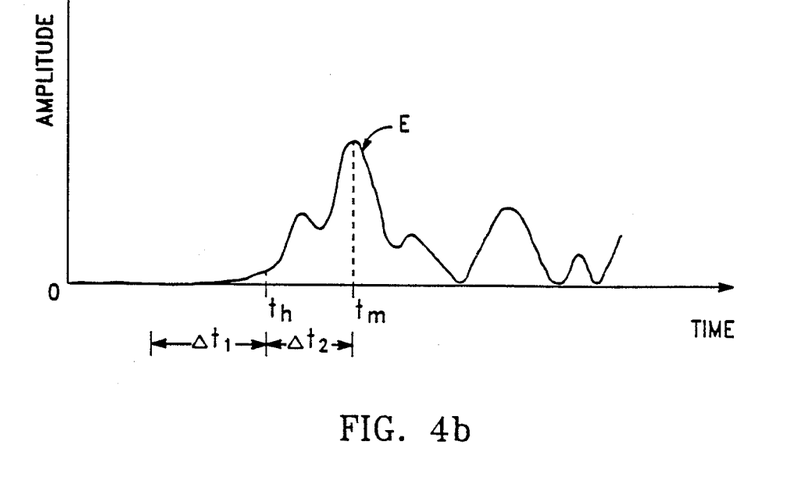

At step 120, the filtered signal F obtained at the highest pressure point (e.g., the in-situ effective pressure) is normalized and an envelope signal E is computed therefrom, as shown in FIG. 4b. By determining the envelope signal E, polarity reversals in the time series signals and filtered signals can be compensated for. At step 130, the traveltime for the maximum in the envelope signal E is located at time $t_m$. At step 140, the envelope signal E is subdivided into two time windows ($\Delta t_1$ and $\Delta t_2$) as shown in FIG. 4b. The first time window $\Delta t_1$ encompasses a selected time interval before the amplitude of the envelope signal E exceeds a predetermined threshold at traveltime $t_h$. The second time window $\Delta t_2$ extends from the point at which the amplitude of envelope signal E exceeds the predetermined threshold at traveltime $t_h$ to the traveltime $t_m$ of the maximum of the envelope signal E determined at step 130.

Those skilled in the art will appreciate that by digitizing both the filtered and the envelope signals, a series of data points can be obtained. Data points within the first and second time windows ($\Delta t_1$ and $\Delta t_2$) of the envelope signal E are curve fitted to separate functions at step 150. Preferably, the functions are polynomials of degree 1 or 2. The best-fit functions for each time window are then extrapolated beyond their respective time windows and can then be solved simultaneously to determine their point of mutual intersection at step 160. The point of intersection will hereafter be referred to as the envelope arrival time $t_{env}$ and comprises a first estimate of the seismic velocity of propagation at the highest pressure point.

The original filtered signal F obtained at the highest pressure point (e.g., the in-situ effective pressure) is next subjected to similar processing. In particular, at step 170, the filtered signal F is subdivided into time windows $\Delta t_1$ and $\Delta t_2$ as shown in FIG. 4a. The time windows ($\Delta t_1$ and $\Delta t_2$) can have generally the same temporal extent and temporal location as those for the envelope signal E. However, the second time window $\Delta t_2$ for the time series preferable extends from the traveltime $t_h$ up to the traveltime associated with the first peak in the time series signal, irrespective of whether the first peak is either positive or negative. Data points within the time windows $\Delta t_1$ and $\Delta t_2$ for the filtered signal F are curve fitted to separate functions at step 180. Preferably, the functions are polynomials of degree 1 or 2. The best-fit functions for each time window are then extrapolated beyond their respective time windows and can then be solved simultaneously to determine their point of mutual intersection at step 190. The point of intersection will hereinafter be referred to as the time series arrival time $t_t$ and comprises a second estimate of the seismic velocity of propagation at the highest pressure point.

At step 194, the original filtered signal F is evaluated at the arrival time $t_t$ and selected characteristics of the filtered signal F can be obtained, including: spectral content, spectral amplitude, and rise time (i.e., slope). The spectral content of the filtered signal F obtained for the highest pressure point at time $t_t$ can be used to determine a cross-correlation length $\lambda$. In particular, the cross-correlation length $\lambda$ can be obtained by Fourier synthesis of the spectral content of the filtered signal F at time $t_t$ at step 198.

At step 200, the arrival times $t_t$ and $t_{env}$ (obtained from steps 160 and 190, respectively) are compared and if $t=t_{env}$, the arrival time will hereafter simply be designated $t_a$ at 210. The arrival time $t_a$ can be employed to provide a measure of the seismic velocity of propagation. If however, the arrival times $t_{env} \neq t_t$, the characteristics obtained for the filtered signal F at step 194 are compared to like characteristics of the imparted energy pulse at step 220. If the spectral content, spectral amplitude and rise time of the filtered signal F do not agree, within selected limits, with the same characteristics for the imparted energy pulse, the arrival time $t_a$ is defined to be $t_a=t_{env}$ at step 230. Alternatively, if the characteristics agree, within selected limits, the arrival time $t_a$ is defined to be $t_a=t_t$ at step 240. Steps 120–240 can be repeated for filtered signals obtained at lesser pressures; however, it has been found that the time series signal quality deteriorates as pressure decreases and that the envelope arrival times $t_{env}$ for filtered signals obtained at lesser pressures can generally provide better estimates of the arrival time $t_a$, and hence seismic velocity than the time series arrival time $t_t$.

An adaptive cross-correlation technique will now be described for determining arrival times, $t_a$ and hence seismic velocities of propagation, in filtered signals obtained at lesser pressures (e.g., less than the in-situ effective pressure). Additionally, a measure of the variation of seismic velocities of propagation with pressure can be obtained.

Figure 5:
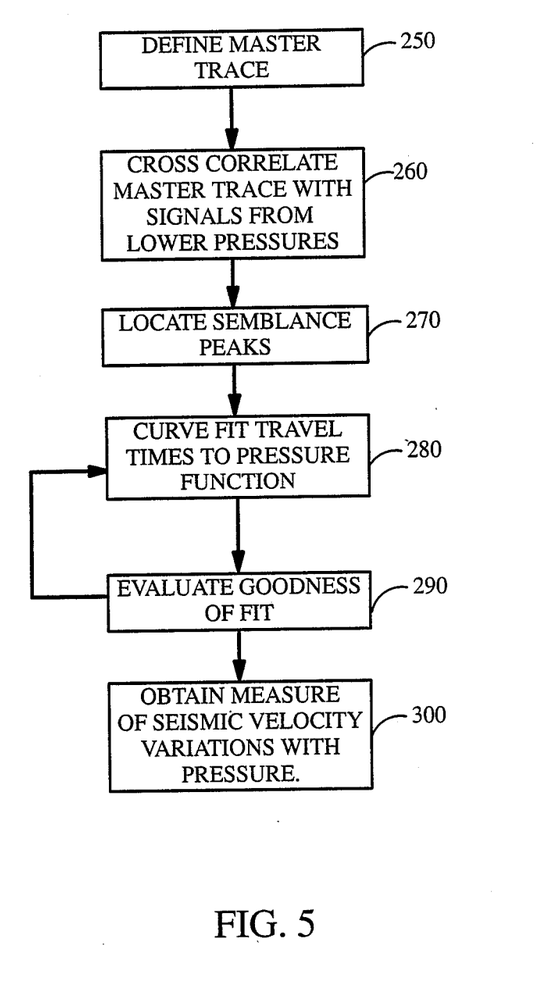
FIG. 5 represents a flow diagram of the present invention to obtain a measure of the variation of seismic velocities with pressure.

Looking now to FIG. 5, the steps of such cross-correlation technique will be described. Specifically, at step 250, a segment of the filtered signal F obtained at the highest pressure point (e.g., in-situ effective pressure) is defined as a master trace for use in cross-correlating with the filtered signals obtained at lesser pressure points. The spectral content of the filtered signal F can be used to define the extent of the master trace. In particular, the cross-correlation length $\lambda$ obtained at step 195 can be employed to define the temporal extent of the master trace. The master trace starts at a time corresponding to the arrival time $t_a$ previously determined at steps 210, 230 or 240, and extends to longer transit times as determined by the cross-correlation length $\lambda$.

At step 260, the master trace is cross correlated with each of the filtered signals obtained at lesser pressures to form a series of cross-correlation functions for each pressure point. Since seismic velocities of propagation are expected to be greatest at the highest pressure, the cross correlation of the master trace with the filtered signals obtained at lesser pressures can be constrained to starting at, traveltime $t_a$ determined at the highest pressure point. Each cross-correlation function can then be searched to locate the traveltimes of the five strongest semblance peaks at step 270. The five strongest semblance peaks for each correlation function and their associated traveltimes are stored in descending order of semblance peak magnitude.

At step 280, the traveltimes associated with the strongest semblance peaks for each pressure point are curved fitted to a pressure function to obtain a measure of seismic velocity of propagation at each pressure point and hence a measure of the variation of seismic velocity with pressure. Prior experience indicates that not all rocks behave similarly but generally exhibit a pressure dependence of seismic velocity characterized by a polynomial or exponential function. After fitting the traveltimes associated with the strongest semblance peaks to the pressure function, the goodness of fit of the traveltimes to the pressure function is evaluated at 290. In particular, the traveltimes exhibiting deviations are replaced by the traveltime associated with the next strongest semblance peak for that pressure point. The process of evaluating the goodness of fit of the traveltimes to the pressure function is carried out iteratively until a specified level of deviation has been achieved, resulting in a more consistent determination of seismic velocities of propagation as well as their variations with pressure. This curve fitting approach is important to avoid using a traveltime not associated with the arrival of the energy pulse. Having achieved the optimized fitting of the traveltimes, one can obtain estimates of the seismic velocities at each pressure point and hence a measure of the variation of seismic velocity with pressure at step 300.

It has also been recognized that rather than simply employ a master trace developed from the signal recorded at the highest pressure point; a new master trace can also be developed from the signal recorded at the next lower pressure after an estimate of velocity (i.e., arrival time $t_a$) has been obtained for the next highest pressure point by returning to steps 250 to 290.

While the present invention has been described with respect to a specific embodiment for employing the pulse transmission method on samples of the earth, those skilled in the art will appreciate that the present method can also be applied to conventionally acquired seismic data including sonic logging and vertical seismic profiling data. While variations in pressure have been used to evaluate variations in seismic velocities, those skilled in the art will appreciate that variations in seismic velocities as a result of varying other extrinsic variables, (e.g., temperature, fluid saturation, deviating stress, magnetic field, frequency, etc.) are also comprehended within the present invention. The present invention is to be limited only by the appended claims.

We claim:

1. A method for estimating the velocities of propagation of seismic energy in the earth, comprising the steps of:
   (a) obtaining time series signals representative of the propagation of an energy pulse through a sample of the earth at a plurality of pressure points within a range of selected pressures;
   (b) forming an envelope signal from the time series signals obtained at the highest pressure point;
   (c) estimating a traveltime for the energy pulse to propagate through the sample of the earth from the envelope signal and its corresponding time series signal;
   (d) defining a segment of the time series signal obtained at the highest pressure point as a master trace, wherein the master trace commences at the estimated traveltime and has a temporal extent related to the spectral content of the time series signal obtained at the highest pressure point;
(e) cross-correlating the master trace with each of the time series signals obtained at lower pressure points and locating traveltimes for maxima in semblance functions resulting therefrom; and
(f) curve fitting the traveltimes associated with the selected semblance maxima, for each pressure point, to a function to provide an estimate of the velocities of propagation of the seismic waves through the earth at selected pressure points.

2. The method of claim 1, wherein the pressures acting on sample range from atmospheric to the corresponding in-situ effective pressure.

3. The method of claim 1, further including:
(a) curve-fitting the traveltimes associated with selected semblance maxima, for each pressure point, to a function to provide a measure of the variation of seismic velocities of propagation with pressure.

4. The method of claim 1, further including:
(a) curve-fitting the traveltimes associated with the largest semblance maxima, for each pressure point, to a function to provide a variation of the seismic velocity propagation with pressure.

5. The method of claim 1, wherein the function is a polynomial of degree N, where $N \leq 2$.

6. A method for estimating the velocity of propagation of seismic energy in the earth, comprising the steps of:
(a) obtaining a plurality of time series signals representative of the propagation of an energy pulse through a sample of the earth;
(b) summing the time series signals and obtaining an envelope signal therefrom;
(c) windowing the envelope signal into first and second time windows and curve fitting the envelope signal within the first and second windows to first and second polynomials, respectively;
(d) determining the point of intersection of the first and second polynomials and obtaining an estimate of the traveltime for the energy pulse to propagate through the sample of the earth; and
(e) estimating a seismic velocity of propagation from the traveltime obtained from the point of intersection of the first and second curve fitted polynomials.

7. A method of estimating the velocity of propagation of seismic energy in the earth, comprising steps of:
(a) obtaining a plurality of time series signals representative of the propagation of an energy pulse through a sample;
(b) summing the time series signals and obtaining a summed signal;
(c) bandpass filtering the summed signal to obtain a filtered signal;
(d) windowing the filtered signal into first and second time windows and curve-fitting the filtered signal within the first and second windows to first and second polynomials, respectively;
(e) determining the point of intersection of the first and second polynomials and obtaining an estimate of the traveltime for the energy pulse to propagate through the sample of the earth; and
(f) estimating a seismic velocity of propagation from the traveltime obtained from the point of intersection of the first and second curve-fitted polynomials.

8. A method for objectively estimating velocities of propagation of seismic energy in the earth, comprising the steps of:
(a) obtaining a time series signal representative of the propagation of an energy pulse through a sample of the earth;
(b) forming an envelope signal from the time series signal and locating the traveltime ($t_m$) of maximum therein as well as the traveltime ($t_h$) at which the envelope signal exceeds a selected threshold;
(c) windowing the envelope signal into first and second time windows, wherein the first time window extends from a selected time up to the the traveltime ) and the second time window extends from the traveltime ($t_h$) up to the traveltime ($t_m$);
(d) curve fitting the first and second time windows of the envelope signal to first and second functions, respectively; and
(e) determining a point of intersection ($t_{env}$) of the first and second functions of the envelope signal and obtaining a first estimate of the velocity of propagation of seismic energy in the earth therefrom.

9. The method of claim 8, further including:
(a) windowing the time series signal into first and second time windows corresponding to the first and second time windows for the envelope signal;
(b) curve-fitting the first and second time windows of the time series signal to third and fourth functions, respectively; and
(c) determining the point of intersection ($t_t$) of the third and fourth functions of the time series signal and obtaining a second estimate of the velocity of propagation of seismic energy in the earth.

10. The method of claim 9, further including:
(a) obtaining characteristics of the energy pulse propagating through the sample and the time series signal, wherein the characteristics include amplitude spectra, frequency spectra and rise time; and
(b) comparing the characteristics of the energy pulse and time series signal to obtain a best estimate of traveltimes ($t_a$) for the energy pulse to propagate through the sample of the earth from the traveltimes ($t_{env}$) and ($t_t$).

11. The method of claim 8, further including:
(a) obtaining a plurality of time series signals;
(b) summing the plurality of time series signals to form a stacked signal; and
(c) forming the envelope signal from the stacked signals.

12. The method of claims 11 further including the step of:
obtaining time series signals at a plurality of pressure points within a selected range of pressures.

13. The method of claim 12, wherein the pressures range from atmospheric to in-situ effective pressure.

14. The method of claim 12 further including steps of:
(a) defining a segment of the time series signal obtained at the highest pressure point as a master trace, wherein the master trace includes the traveltime ($t_a$);
(b) cross-correlating the master trace with the time series signal obtained at lesser pressure points and locating the traveltimes of maxima in the resulting semblance functions; and (c) curve-fitting selected traveltimes of the maxima in the semblance functions obtained at each pressure point to a pressure function to obtain an estimate of the variation of velocities of propagation of seismic energy as a function of pressure.

15. The method of claim 14 wherein the traveltimes associated with the largest maxima of the semblance function for each pressure point are curve fitted to the pressure function.

16. The method of claim 15 further including the step of iteratively curve-fitting selected traveltimes associated with lesser maxima in the semblance function to the pressure function so as to optimize the degree of fit to the pressure function.

17. A method for estimating the velocity of propagation of seismic waves in the earth, comprising the steps of:

(a) obtaining time series signals representative of the propagation of an energy pulse through a sample of the earth;
(b) estimating a traveltime ($t_t$) from the time series signal for the energy pulse to propagate through the sample of the earth;
(c) forming an amplitude envelope signal from the time series signals and estimating a traveltime ($t_{env}$) therefrom for the energy pulse to propagate through the sample of the earth;
(d) obtaining selected characteristics of the time series signal and the energy pulse, wherein the characteristics include amplitude spectra, frequency spectra and rise time; and
(e) comparing the selected characteristics of the time series signal and the energy pulse, whereby an estimated velocity of propagation of the seismic energy through the earth can be obtained from the envelope traveltime ($t_{env}$) and the time series traveltime ($t_t$).

* * * * *

UNITED STATES PATENT AND TRADEMARK OFFICE
CERTIFICATE OF CORRECTION

PATENT NO. : 4,933,911

DATED : June 12, 1990

INVENTOR(S) : CARL H. SONDERGELD, ET AL

It is certified that error appears in the above--identified patent and that said Letters Patent is hereby corrected as shown below:

Column 2, line 25, after "pressure" insert --.--.

Column 2, line 62, "distance L" should read --distance $\ell$--.

Column 2, line 66, "distance L" should read --distance $\ell$--.

Claim 8, Line 14, "Traveltime" should read --traveltime $(t_h)$--.

Signed and Sealed this

Seventh Day of April, 1992

*Attest:*

HARRY F. MANBECK, JR.

*Attesting Officer*     *Commissioner of Patents and Trademarks*